March 4, 1969  M. MARINESCU  3,431,477
ELECTRIC MOTOR WITH ALTERNATING LINEAR MOTION
Filed Aug. 4, 1965

INVENTOR:
Matei Marinescu
BY
Karl J. Ross
Attorney

United States Patent Office 3,431,477
Patented Mar. 4, 1969

3,431,477
ELECTRIC MOTOR WITH ALTERNATING LINEAR MOTION
Matei Marinescu, Bucharest, Rumania, assignor to Ministerul Industriei Constructiilor de Masini, Bucharest, Rumania
Filed Aug. 4, 1965, Ser. No. 477,209
U.S. Cl. 318—125                                  6 Claims
Int. Cl. H02p 1/38, 5/28, 7/36

ABSTRACT OF THE DISCLOSURE

Electric motor whose stator comprises two sets of axially and peripherally staggered poles co-operating with an axially shiftable armature consisting of one or more magnetically permeable members alternately alignable with the two sets of poles in different axial positions of the armature, the two sets of poles being alternately energized via respective halfwave rectifiers in the course of a single cycle of an A-C power source.

The invention relates to a combination of magnetic and electric circuits allowing alternating linear motion of a movable armature for the purpose of realizing an alternating linear electromagnetic type of motor, to actuate, by direct coupling, piston pumps, compressors, sonic generators, etc.

Up to now, in the absence of a linear motor with a performance rating of the same order of magnitude as that of rotary motors, the actual practice of causing linear reciprocations has been to transform rotary motion into translational motion by mechanical transmission means of the pitman-and-crank type.

The main difficulty in designing an efficient linear motor of the electromagnetic type is the necessity of reducing the inertial forces due to the acceleration of a reciprocating system.

For a given stroke length and operating frequency, the reduction of these inertial forces, desirable in order that the displacement should not lag too far behind the driving force and thereby reduce the power factor of the machine, requires the reduction of the mass of the movable armature.

Such a reduction, however, cannot be achieved with any of the existing magnetic circuit constructions, at least for motors fed by A.C. mains having a frequency of 50 c.p.s., in which case the inertial forces are considerable, being proportional to the square of the frequency.

Therefore, present practice is to compensate the inertial forces partly by elastic forces.

The inconvenience of this practice lies in the mechanical resonance effect, the motion being thus affected by small variation in the frequency of the A.C. mains, as well as by the fatigue, in time, of the springs which supply the elastic forces.

The new combination of magnetic and electric circuits forming the subject of the present invention eliminates the necessity for providing elastic forces to compensate the inertial forces, thereby reducing the deleterious effect of these forces through reduction of the movable armature mass and of the stroke length by special constructive means for the magnetic circuit, combined with special devices in the electric circuit to transform the alternating current into current pulses.

The relationship to be satisfied for optimal operating conditions with such a combination formula of magnetic and electric circuitry, can be expressed mathematically in an electro-mechanical resonance formula:

$$fs = k\sqrt{\frac{\tau}{m}}$$

where: $\tau$=work done during half a period by the electromagnetic forces, $f$=frequency, $s$=stroke, $m$=mass of armature, $k$=constant depending on the nature of the load.

This formula is satisfied by the values of actual magnetic and electric circuit constants of my improved oscillatory motor, developed according to the invention, when operated from A.C. mains with a frequency of 50 c.p.s.

Figure 1:
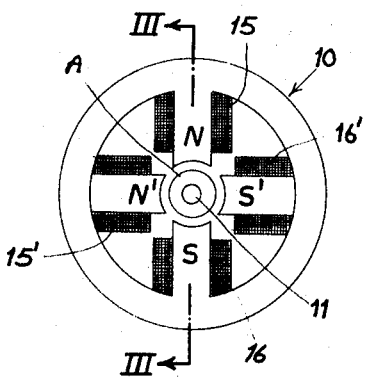
FIG. 1 is a face view, partly in section, of an electromagnetic unit according to the invention.
Figure 3:
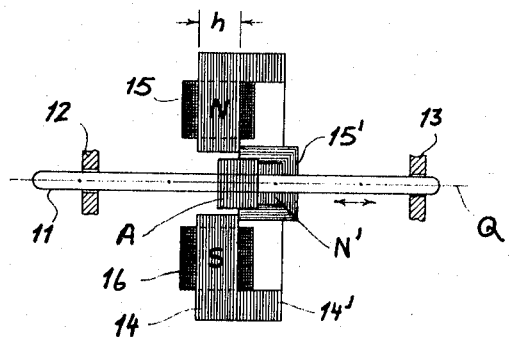
FIG. 3 is a cross-sectional view taken on the line III—III of FIG. 1.
Figure 2:
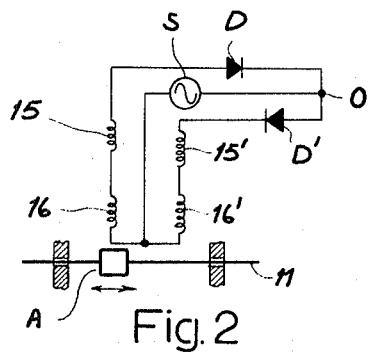
FIG. 2 is a circuit diagram relating to the unit of FIG. 1.

The system shown in FIGS. 1–3 comprises a stator 10 and a linearly reciprocable armature 11 supported in bearings 12, 13. Stator 10 consists of two laminated structures 14 and 14', each of these structures comprising a pair of diametrically opposite magnet poles surrounded by respective coils 15, 16 and 15', 16'. The two poles of structure 14, designated N and S, are in quadrature with the poles N', S' of structure 14' and are axially offset therefrom by the thickness of the stack of laminations constituting each of these poles. A magnetically permeable member A of armature 11 consists of a cylindrical stack of similar thickness. All the laminations lie in planes perpendicular to the axis Q along which the armature is movable. Thus, armature member A may be alternately aligned with the pole pair N, S and the pole pair N', S'.

As illustrated in FIG. 2, the coils 15, 16 and 15', 16' are connected for alternate energization from a source S of alternating current by way of respective diodes D and D' in series therewith; the junction of the two half-wave rectifiers D and D' has been shown at O.

In operation, diodes D and D' conduct during alternate half-cycles of source S so that poles N, S, associated with coils 15 and 16, and poles N', S', associated with coils 15' and 16', are alternately energized. The two pole pairs thus attract the armature member A in one direction or the other, causing it to oscillate linearly at a rate corresponding to the frequency of source S. The stroke of the armature corresponds to the thickness $h$ of each stator structure 14, 14' and of member A.

If the force necessary for the displacement of armature 11 and its load (not shown) cannot be developed by a single pole pair, several pole pairs may be provided for attracting a corresponding number of armature members in either direction. This has been illustrated in FIG. 4 where the armature is shown to include three permeable members $A_1$, $A_2$, $A_3$ co-operating with respective poles $N_1$, $N_1'$; $N_2$, $N_2'$; $N_3$, $N_3'$; the corresponding south poles have not been illustrated in FIG. 4. This figure also shows additional poles $N_4$ and $N_4'$ whose presence enables the armature to oscillate at a rate corresponding to a fraction of the source frequency. Thus, as shown in graph (a) of FIG. 4, the armature members $A_1$–$A_3$ are aligned with poles $N_1$–$N_3$ during the first half of a first alternating-current cycle; in the second half of that cycle, they confront the poles $N_1'$–$N_3'$, axially interleaved with poles $N_1$–$N_3$, as shown in graph (b); in the first half of a second cycle, the armature members face the poles $N_2$–$N_4$, see graph (c); in the second half of the second cycle, graph (d), they are opposite the poles $N_2'$–$N_4'$. In the first and the second half of a third cycle, the armature returns to the positions of graphs (c) and (b), respectively; thereafter, the position of graph (a) is restored whereupon the sequence is repeated.

Figure 4:
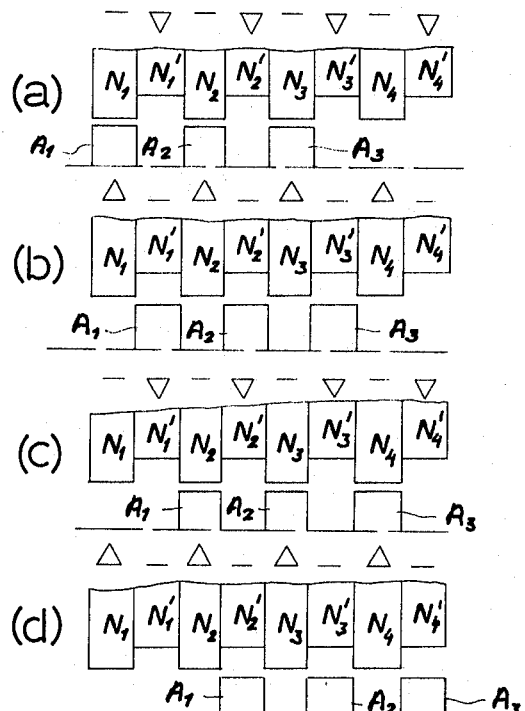
FIG. 4 is a set of graphs diagrammatically representing successive positions of a modified unit generally similar to that of FIGS. 1 and 3.

It will thus be seen that the system of FIG. 4 enables the establishment of an oscillating frequency equal to $f/n$ where $f$ is the source frequency (e.g. 50 c.p.s.) and $n$ is an integer, here specifically 3. If $p$ represents the number of pole pairs of one stator structure, $p'$ the number of pole pairs of the other stator structure and $q$ the number of armature members, it may be stated that $$p = p' = q + \frac{n-1}{2} \quad (1)$$

if $n$ is an odd number and $$p' = p - 1 = q + \frac{n}{2} - 1 \quad (2)$$

if $n$ is an even number. From the latter equation we can derive the relationship $$p + p' - 1 = 2q + n - 2 \quad (3)$$

whence $$n = p + p' - 2q + 1 \quad (4)$$

which applies generally to both even and odd values of $n$.

Figure 5:
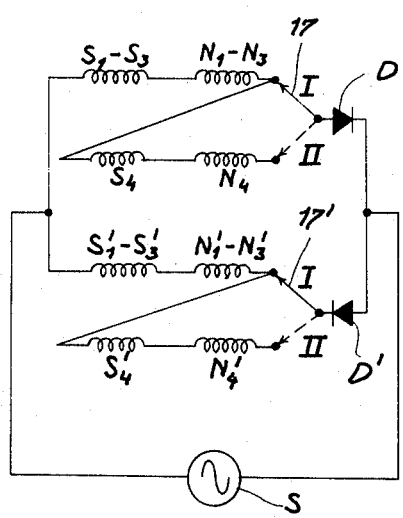
FIG. 5 is a circuit diagram relating to the unit of FIG. 4.

FIG. 5 shows the source S connected by way of diode D in series with the first three pole pairs $S_1$–$S_3$, $N_1$–$N_3$ of one stator structure and via the corresponding pole pairs $N_1'$–$N_3'$, $S_1'$–$S_3'$ of the other stator structure, the circuit being completed by two switch contacts 17, 17' in a position I; in that position the remaining poles $N_4$, $S_4$ and $N_4'$, $S_4'$ are inactive so that the system of FIG. 4 operates in the same manner as that of FIGS. 1–3, i.e. with its armature oscillating at the source frequency. With switch contacts 17, 17' in their alternate position II, the coils of poles $S_4$, $N_4$ are in series with those of poles $S_1$–$S_3$ and $N_1$–$N_3$ while the coils of poles $N_4'$ are in series with those of poles $S_1'$–$S_3'$, $N_1'$–$N_3'$. The system then operates in the manner described with reference to the several graphs of FIG. 4, with the armature oscillating at one-third the source frequency.

The energized state of the several poles has been indicated by small triangles in FIG. 4.

I claim:

1. An electric motor comprising a stator with a plurality of first pairs and a plurality of second pairs of poles interleaved along an axis, the poles of each pair being disposed on opposite sides of said axis, an armature linearly reciprocable along said axis, said armature including at least one magnetically permeable member disposed for alternate confrontation of said pole pairs in different axial positions of the armature, and circuit means for alternately energizing said pole pairs.

2. A motor as defined in claim 1 wherein said circuit means comprises a source of alternating current, first and second energizing windings for said first and second pole pairs, respectively, connected across said source, and rectifier means for alternately passing current from said source through said first and second windings during alternate half-cycles of the alternating current.

3. A motor as defined in claim 2 wherein said rectifier means comprises a pair of diodes respectively connected in series with said energizing windings.

4. A motor as defined in claim 1 wherein the number of permeable members of said armature is less than the number of at least said first pole pairs whereby said armature oscillates at a fraction of the frequency of said source.

5. An electric motor comprising a stator with at least one first pair and at least one second pair of poles spaced along an axis, the poles of each pair being disposed on opposite sides of said axis, an armature linearly reciprocable along said axis, said armature including at least one magnetically permeable member disposed for alternate confrontation of said pole pairs in different axial positions of the armature, and circuit means for alternately energizing said pole pairs, said first and second pole pairs being disposed in quadrature with each other around said axis.

6. A motor as defined in claim 5 wherein said stator has a plurality of first pole pairs axially interleaved with a plurality of second pole pairs.

References Cited

UNITED STATES PATENTS

| | | | |
|---|---|---|---|
| 1,637,717 | 8/1927 | Weyandt | 318—125 |
| 3,293,515 | 12/1966 | Klemm | 318—125 XR |
| 3,336,488 | 8/1967 | Scott | 310—30 XR |
| 3,201,670 | 8/1965 | Myers | 310—30 XR |
| 3,119,940 | 1/1964 | Pettit et al. | 310—24 |

FOREIGN PATENTS 828,134  2/1960  Great Britain.

MILTON O. HIRSHFIELD, *Primary Examiner.*

D. F. DUGGAN, *Assistant Examiner.*

U.S. Cl. X.R.

310—24, 35